March 28, 1933. C. R. McMINN ET AL Re. 18,776

ANTISLAP RING

Original Filed Nov. 13, 1926

Inventors
CHARLES RICHARD McMINN
JAMES THOMAS ROBINSON
By JAMES BLAIR HOLLIDAY, INCOMPETENT
(BY ELSIE C. COUCH, GUARDIAN)
Joseph Dugan Attorney Reissued Mar. 28, 1933 Re. 18,776

UNITED STATES PATENT OFFICE

CHARLES RICHARD McMINN, JAMES THOMAS ROBINSON, AND JAMES BLAIR HOLLIDAY, INCOMPETENT, OF LOS ANGELES, CALIFORNIA, BY ELSIE C. COUCH, GUARDIAN, OF LOS ANGELES, CALIFORNIA, ASSIGNORS, BY MESNE ASSIGNMENTS, TO THE SIMPLEX PISTON RING COMPANY OF AMERICA, INC.

ANTISLAP RING

Original No. 1,660,846, dated February 28, 1928, Serial No. 148,307, filed November 13, 1926. Application for reissue filed December 6, 1929. Serial No. 412,253.

Our invention relates to piston rings, and has for its principal object the provision of a ring combined with a resilient expander element and used in conjunction with the regular packing and sealing rings to prevent piston slap and to maintain substantial parallelism, or coincidence, between the axes of the piston and cylinder during the reciprocation of the piston.

Other objects of the invention will become apparent as the detailed description of the invention proceeds.

Figure 1:
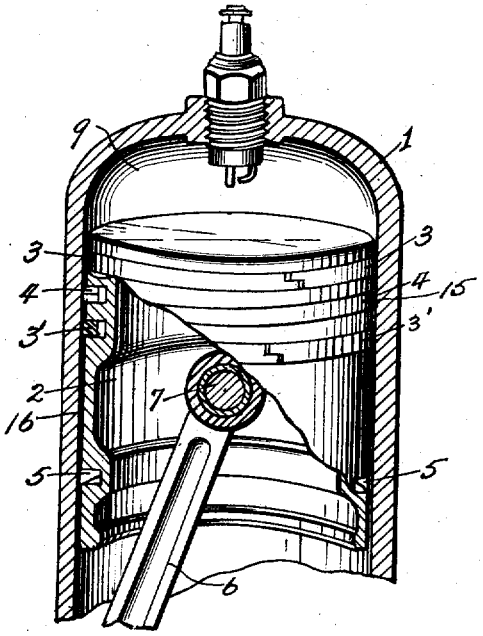
Fig. 1 is a fragmentary central vertical section through the cylinder of any ordinary internal combustion engine, a piston being shown in said cylinder partly in elevation and partly in vertical section.
Figure 3:
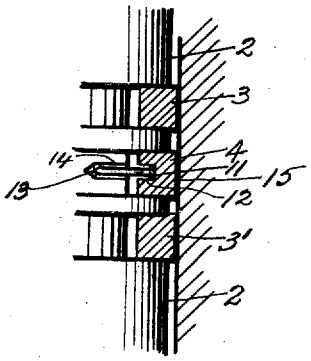
Fig. 3 is a fragmentary diagrammatic vertical section, to an enlarged scale, illustrating the arrangement of the several parts of our invention in the cylinder.
Figure 2:
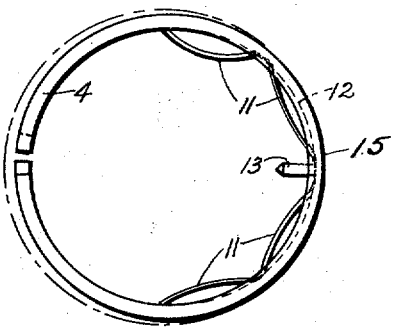
Fig. 2 is a plan view of our antislap ring with the resilient expander element applied thereto.

As shown in the drawing, the cylinder 1 has a piston 2 mounted to reciprocate therein with the usual operative sliding clearance. The piston 2 may be provided with any desired number of peripheral grooves to receive the usual packing and oil rings. In this particular case, it is shown as provided with three grooves, in which are seated the ordinary piston rings 3 and 3′ and the anti-slap ring 4 which constitutes the present invention.

In large type pistons, having three upper ring grooves, it is preferable to locate the antislap ring 4 between the upper plain ring 3 and the lower oil ring 3′. With smaller type pistons, having only two grooves in their upper part, the oil ring is preferably located in the groove 5 formed in the lower part of the piston skirt; and our antislap ring is placed in the second groove from the top.

All three rings are trans-split in the usual manner; and the plain and oil rings may be located in any desired angular positions in the pistons. For the most efficient result, however, it is preferable to locate the antislap ring 4 in its piston groove so that its trans-split ends lie substantially equidistantly apart from a plane perpendicular to the axis of the wrist pin 7, which is shown in the drawing as pivotally connected to the upper end of the usual connecting rod 6.

In actual operation and under perfect working conditions, when the gases are compressed and exploded in the combustion chamber 9, the piston is caused to rotate a small amount around the pin 7. This is, of course, due to the fact that the ordinary piston rings are peripherally resilient and therefore do not hold the piston rigidly in axial alinement with the axis of the cylinder.

To overcome the rotation, or slap, of the piston around its wrist pin 7, the ring 4 is installed in one of the intermediate grooves; and the slap is eliminated by locating a segmental wave-like resilient expander element 11 between the inner periphery of the ring 4 and the bottom of the piston groove in which the ring 4 is seated.

The expander element 11 is, preferably, seated in the piston groove with its center substantially diametrically opposite the transplit ends of the ring 4; that is, with its center in a plane substantially perpendicular to the axis of the wrist pin 7 at the center thereof. The inner periphery of the ring 4 is preferably provided with an eccentric arcuate groove 12 to receive the expander element 11 and thereby lock the ring 4 yieldingly against rotation bodily around the piston 1.

In order to prevent bodily rotation of the expander element 11 around the piston 1, the element 11 has the dowel pin 13 formed integrally thereon, or otherwise firmly secured thereto; and this pin 13 is slidably received in the radial recess 14 formed in the piston 1. This dowel pin connection permits the resilient element 11 to move bodily relative to the piston 1, but prevents any substantial bodily rotation of the element around the piston.

This construction and arrangement of the several parts of the ring 4, by which the ring is yieldingly held against rotation around the piston and cylinder, and by which the expander element is positively locked against such rotation, ensures a "rubbed" fit between the antislap ring 4 and the cylinder wall, which is not obtainable by prior constructions.

The provision of the groove 12 in the ring 4 is not absolutely necessary to the practice of our invention; it is merely embodied in our preferred embodiment of the invention. The locking of the resilient expander 11 against rotation around the piston is absolutely necessary in order to control the application of a preponderance of radial pressure against the ring in a fixed direction. In our preferred form this preponderance of radial pressure is applied in a direction at right angles to the axis of the wrist pin; but our invention is not to be considered as limited to use in this particular direction, since it may be used to apply pressure in a fixed direction either along the axis of the wrist pin, or in any other intermediate radial direction.

The resilient element 11 is shown in the drawing as a winged wire spring of sinus form bent so that when it is compressed between the ring and the piston it will ensure regularity and maintain contact between the piston and cylinder during the entire stroke. This element 11, which may be a flat wave member, is adaptable for use on any type of ring other than the usual spring type ring, such as asbestos, rubber, packing, or the like. Our invention is intended to cover any type of ring which may be caused to be expanded and effect frictional engagement of the piston with the cylinder wall for the elimination or prevention of piston slap.

When installed, the element 11 preferably extends through an arc of 180 degrees; and the eccentric inner groove 12, when provided extends through the same angle. However, it may be necessary to increase this angle through thirty or more degrees on pistons of larger type.

When the ring 4 is compressed about the piston 2, one side of the ring is forced against one side of the cylinder wall, as indicated by the numeral 15. The spring 11 then forces, as indicated by the numeral 16, the opposite side of the piston against the other side of the cylinder wall. At the same time, the ring 4 has perfect circumferential contact around the cylinder wall, without interfering with the easy reciprocation of the piston in the cylinder.

What we claim is:

1. A cylinder, a piston having a groove around its periphery and loosely fitting said cylinder, a ring having an eccentric arcuate groove on its inner periphery and seated in the groove in said piston, a wave-like resilient expander seated in both of said grooves to exert a preponderance of radial pressure in one direction on said ring and to lock the ring yieldingly against rotation around said piston, said piston being provided with a recess, and a pin on said expander engaging said recess to prevent substantial bodily rotation of said expander around said piston.

2. A cylinder, a piston having a groove around its periphery and loosely fitting said cylinder, a ring having an eccentric arcuate groove on its inner periphery and seated in the groove of said piston, a connecting rod, a wrist pin pivotally connecting said rod to said piston, a wave-like resilient expander seated in both of said grooves to exert a preponderance of pressure on said ring in a direction substantially at right angles to the axis of said pin and to lock the ring yieldingly against bodily rotation around said piston, and a dowel connection between said expander and piston to prevent substantial bodily rotation of said expander relative to said piston.

In testimony whereof, we have signed our names to this amended specification.

CHARLES RICHARD McMINN.
JAMES THOMAS ROBINSON.
ELSIE C. COUCH,
*Guardian of Estate of James Blair Holliday.*